United States Patent
Abelha Ferreira et al.

(10) Patent No.: US 11,762,895 B2
(45) Date of Patent: Sep. 19, 2023

(54) METHOD AND SYSTEM FOR GENERATING AND ASSIGNING SOFT LABELS FOR DATA NODE DATA

(71) Applicant: EMC IP Holding Company LLC, Hopkinton, MA (US)

(72) Inventors: Paulo Abelha Ferreira, Rio de Janeiro (BR); Vinicius Michel Gottin, Rio de Janeiro (BR); Tiago Salviano Calmon, London (GB)

(73) Assignee: EMC IP Holding Company LLC, Hopkinton, MA (US)

(*) Notice: Subject to any disclaimer, the term of this patent is extended or adjusted under 35 U.S.C. 154(b) by 79 days.

(21) Appl. No.: 17/462,400

(22) Filed: Aug. 31, 2021

(65) Prior Publication Data

US 2023/0060593 A1    Mar. 2, 2023

(51) Int. Cl.
*G06F 16/00* (2019.01)
*G06F 16/35* (2019.01)
*G06F 16/28* (2019.01)

(52) U.S. Cl.
CPC .......... *G06F 16/355* (2019.01); *G06F 16/285* (2019.01); *G06F 16/358* (2019.01)

(58) Field of Classification Search
None
See application file for complete search history.

(56) References Cited

U.S. PATENT DOCUMENTS

| | | | |
|---|---|---|---|
| 8,977,621 B1 | 3/2015 | Paiz | |
| 9,355,359 B2 * | 5/2016 | Welinder | G06F 18/2185 |
| 11,073,828 B2 * | 7/2021 | Paden | G01C 21/28 |
| 11,468,128 B1 | 10/2022 | Paiz | |
| 11,470,064 B2 * | 10/2022 | Lally | G06F 9/5027 |
| 2017/0068714 A1 | 3/2017 | Selfridge et al. | |
| 2019/0294627 A1 | 9/2019 | Chaudhuri et al. | |
| 2021/0182912 A1 * | 6/2021 | Misra | G06N 3/045 |
| 2021/0248105 A1 * | 8/2021 | Gentile | G06F 16/1734 |

(Continued)

OTHER PUBLICATIONS

D. E. Rumelhard, G. E. Hinton and R. J. Williams, "Learning representations by back-progating errors," Nature, vol. 323, Oct. 1986.

(Continued)

*Primary Examiner* — Debbie M Le
(74) *Attorney, Agent, or Firm* — Chamberlain, Hrdlicka, White, Williams, & Aughtry

(57) ABSTRACT

Techniques described herein relate to a method for managing data of data nodes. The method includes obtaining, by a data node manager, a soft labeling request; in response to obtaining the soft labeling request: sending, by the data node manager, requests for processed data to data nodes associated with the data node manager; obtaining, by the data node manager, processed data from the data nodes; merging, by the data node manager, the processed data to obtain processed data; performing, by the data node manager, clustering on the processed data to obtain soft label metadata; associating, by the data node manager, the soft label metadata with live data associated with the data nodes; and performing, by the data node manager, labeling actions using the live data and the soft label metadata.

17 Claims, 5 Drawing Sheets

(56) References Cited

U.S. PATENT DOCUMENTS

2022/0019829 A1* 1/2022 Tal .................. G06V 20/58

OTHER PUBLICATIONS

Oza, P. and Patel, V.M., 2019. "C2AE: Class Conditioned Auto-Encoder for Open-set Recognition". In Proceedings of the IEEE/CVF Conference on Computer Vision and Pattern Recognition (pp. 2307-2316).

Endres, D.M. and Schindelin, J.E., "A New Metric for Probability Distributions". IEEE Transactions on Information theory, vol. 49, No. 7, pp. 1858-1860, Jul. 2003 (3 pages).

H. Brendan McMahan et al.; "Communication-Efficient Learning of Deep Networks from Decentralized Data"; Proceedings of the 20th International Conference on Artificial Intelligence and Statistics, Proceedings of Machine Learning Research (PMLR); vol. 54; pp. 1273-1282; 2017 (http://proceedings.mlr.press/v54/mcmahan17a.html).

K. Makino and T. Uno, "New Algorithms for Enumerating All Maximal Cliques", Scandinavian Workshop on Algorithm Theory, pp. 260-272, 2004 (12 pages).

Konecny et al., Federated Learning: Strategies for Improving Communication Efficiency, Oct. 18, 2016, 5 pages.

Li et al., Federated Learning: Challenges, Methods, and Future Directions, Aug. 21, 2019, 21 pages.

Nelson, J., 2012. "Sketching and Streaming Algorithms for Processing Massive Data". XRDS: Crossroads, The ACM Magazine for Students, 19(1), pp. 14-19.

Wang et al., "Dataset Distillation", arXiv preprint arXiv:1811.10959. v3, Feb. 24, 2020, 14 pages.

Wang et al., Dataset Distillation, Nov. 27, 2018, 14 pages.

Zhou et al., Distilled On-Shot Federated Learning, Oct. 26, 2020, 14 pages.

* cited by examiner

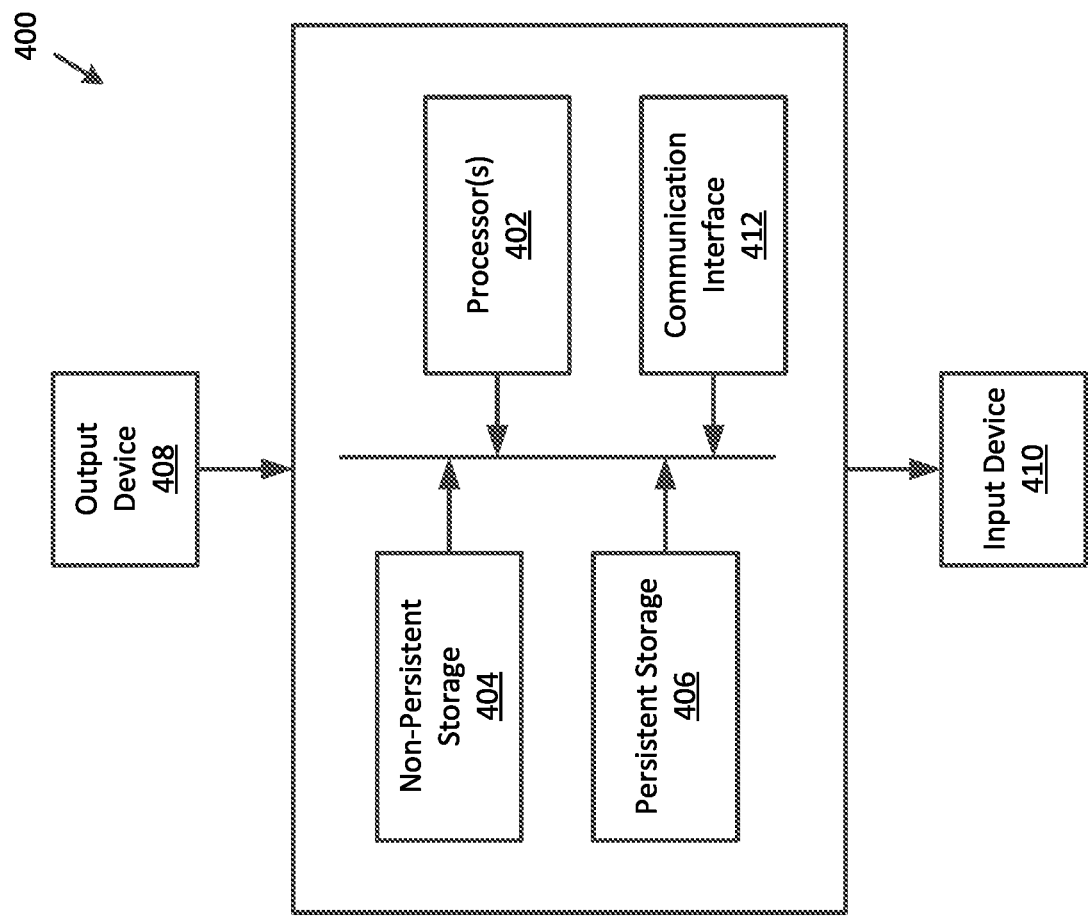

METHOD AND SYSTEM FOR GENERATING AND ASSIGNING SOFT LABELS FOR DATA NODE DATA

BACKGROUND

Computing devices may provide services. To provide the services, the computing devices may generate and/or use data. The data may require processing to be used to provide the services. Additionally, the data may be transmitted between computing devices for processing. The processed data may be used to provide the services.

SUMMARY

In general, certain embodiments described herein relate to a method for managing data of data nodes. The method may include obtaining, by a data node manager, a soft labeling request; in response to obtaining the soft labeling request: sending, by the data node manager, requests for processed data to data nodes associated with the data node manager; obtaining, by the data node manager, processed data from the data nodes; merging, by the data node manager, the processed data to obtain processed data; performing, by the data node manager, clustering on the processed data to obtain soft label metadata; associating, by the data node manager, the soft label metadata with live data associated with the data nodes; and performing, by the data node manager, labeling actions using the live data and the soft label metadata.

In general, certain embodiments described herein relate to a non-transitory computer readable medium that includes computer readable program code, which when executed by a computer processor enables the computer processor to perform a method for managing data of data nodes. The method may include obtaining, by a data node manager, a soft labeling request; in response to obtaining the soft labeling request: sending, by the data node manager, requests for processed data to data nodes associated with the data node manager; obtaining, by the data node manager, processed data from the data nodes; merging, by the data node manager, the processed data to obtain processed data; performing, by the data node manager, clustering on the processed data to obtain soft label metadata; associating, by the data node manager, the soft label metadata with live data associated with the data nodes; and performing, by the data node manager, labeling actions using the live data and the soft label metadata.

In general, certain embodiments described herein relate to a system for managing data of data nodes. The system may include a data node manager associated with data nodes. The data node manager may include a processor and memory, and is configured to obtain a soft labeling request; in response to obtaining the soft labeling request: send requests for processed data to data nodes associated with the data node manager; obtain processed data from the data nodes; merge the processed data to obtain processed data; perform clustering on the processed data to obtain soft label metadata; associate the soft label metadata with live data associated with the data nodes; and perform labeling actions using the live data and the soft label metadata.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 4 shows a diagram of a computing device in accordance with one or more embodiments of the invention.

DETAILED DESCRIPTION

Figure 1:
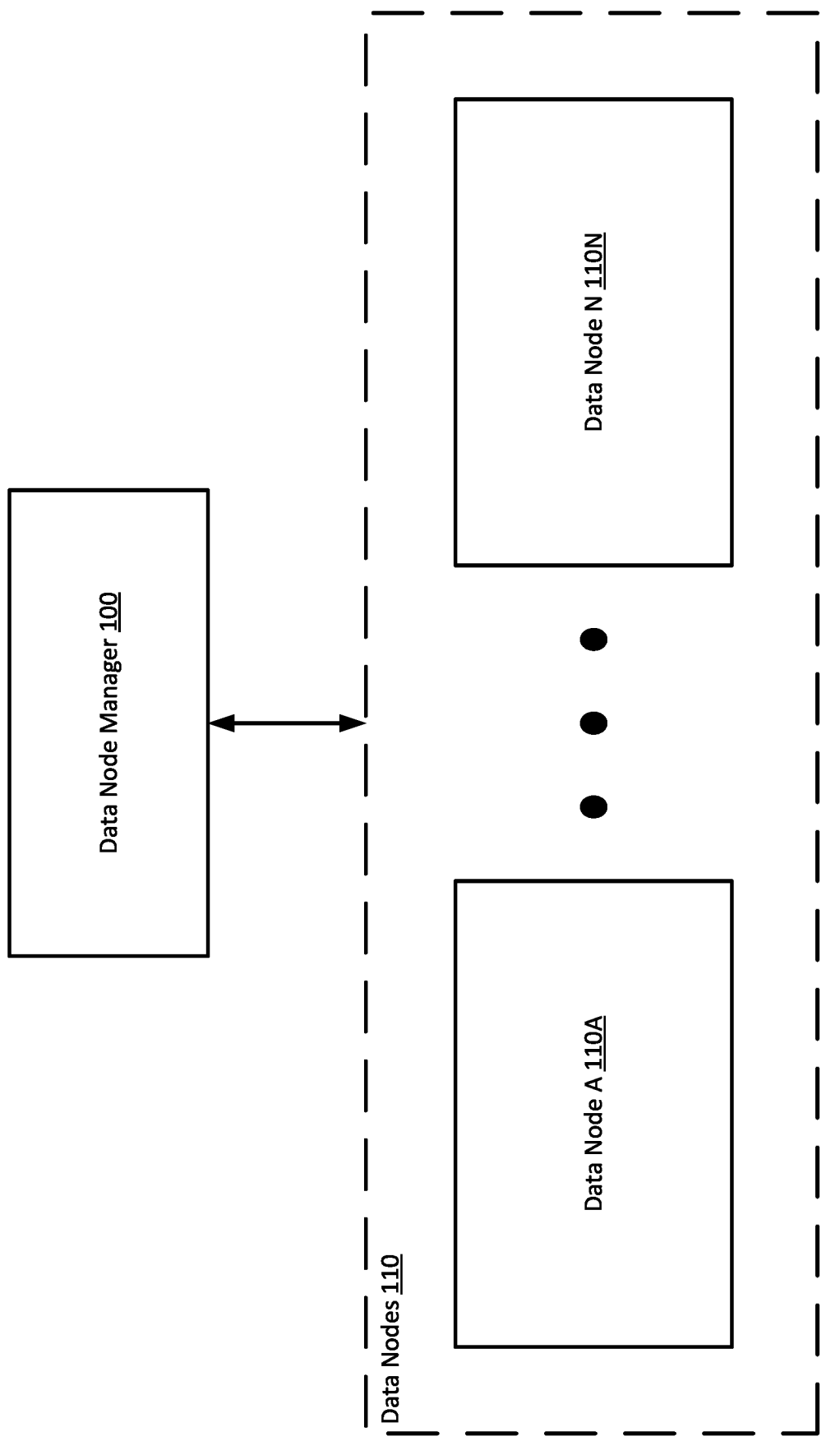
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments of the invention relate to methods, systems, and non-transitory computer readable mediums for generating and assigning soft labels for data nodes.

In one or more embodiments of the invention, data nodes obtain and/or otherwise possess large quantities of data. Such data may be used by the data nodes and/or other entities to train and/or execute models to provide computer implemented services (e.g., inferencing, natural language processing, facial recognition, etc.). To be used for such purposes, the data may require labeling.

In one or more embodiments of the invention, the data is associated with one or more labels (i.e., classifications) that may be relevant for training and/or executing models to perform the aforementioned computer implemented services. For example, a data node may be a vehicle that includes sensors that capture images. The images may be used to train and/or execute an inferencing model used during self-driving of the vehicle (e.g., autopilot). The images may include image data that depicts one or more labels such as stop signs, vehicles, traffic lights, pedestrians, lane boundaries, speed limit signs, and/or other and/or additional labels that may be relevant for training and/or executing an inferencing model to perform self-driving. The images would require the labels to be associated with the image data in order to train and/or refine the inferencing model.

In one or more embodiments of the invention, the data nodes include a large quantity of edge devices (e.g., a vehicle, a security camera, etc.). Each data node of the data nodes may act as an edge device that obtains large quantities of data that require labeling. In one or more embodiments of the invention, such labeling of large quantities of data for large quantities of data nodes may be performed by human annotators. While highly accurate, such labeling by human annotators may be expensive both temporally and financially. Additionally, the data nodes themselves may not include the computing resources necessary to perform the required labeling of such large quantities of data.

To address, at least in part, the aforementioned problems that may arise when labeling large quantities of data obtained by data nodes, in one or more embodiments of the invention, a data node manager generates and assigns soft labels to data of data nodes using processed data obtained from the data nodes. Such processed data may include classified data obtained from auto-classifiers of data nodes that include labeled data, or such processed data may include unclassified data obtained from auto-encoders of data nodes that do not include labeled data. In one or more embodiments of the invention, the data node manager merges the processed data obtained from the data nodes and performs clustering on the merged processed data to generate soft label metadata associated with the data of the data nodes used to generate the processed data. The soft label metadata may include soft labels.

In one or more embodiments of the invention, soft labels include probabilistic distributions of labels for the data. As an example, for an image included in the data of a data node, a soft label associated with the image may include a distribution of probabilities (e.g., percentages) that the image includes one or more labels (e.g., a face, a stop sign, a vehicle, etc.) relevant to a particular model performing a computer implemented service.

In one or more embodiments of the invention, the data node manager uses the soft labels to perform labeling actions. Such actions may include assigning hard labels to data node data, providing the soft labels to a human annotator for review, storing the soft labels for future use, and/or other and/or additional labeling actions without departing from the invention.

FIG. 1 shows a diagram of a system in accordance with one or more embodiments of the invention. The system may include a data node manager (100) and data nodes (110). The data nodes (110) may include any quantity of data nodes without departing from the invention. For example, the data nodes (110) may include data node A (110A) and data node N (110N). The system may include other and/or additional devices and/or components without departing from the invention. The devices and components of the system illustrated in FIG. 1 may be operatively connected via any combinations of wired (e.g., Ethernet) and/or wireless (e.g., WAN) connections without departing from the invention. Each of the aforementioned components of the system of FIG. 1 is discussed below.

In one or more embodiments of the invention, the data node manager (100) includes the functionality to perform soft label generation services for the data nodes (110). The soft label generation services may include generating soft labels using processed data obtained from the data nodes (110) and associating the soft labels with live data of the data nodes (110). To perform the soft label generation services, the data node manager (100) may include the functionality to perform the methods depicted in FIG. 2A. For additional information regarding the functionality of the data node manager (100), refer to FIG. 2A. The data node manager (100) may include other and/or additional functionalities without departing from the invention.

In one or more embodiments of the invention, the data node manager (100) is implemented as one or more computing devices. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors (not shown) for obtaining data, and/or any combination thereof. In one or more embodiments of the invention, the data node manager (100) includes more computing resources (i.e., the components discussed above) than the data nodes (110) to generate and assign soft labels. For additional information regarding computing devices, refer to FIG. 4.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments of the invention, the data nodes (110) include the functionality to perform computer implemented actions and/or services and obtain soft label generation services from the data node manager (100). The computer implemented actions and/or services may include any computer implemented functionality without departing from the invention. The computer implemented functionality may include, for example, inferencing, training for machine learning, implementing in-memory databases, classification, data analysis, data processing, providing services to client devices, serving web content via the Internet, data backup services, etc.

In one or more embodiments of the invention, to obtain soft label generation services from the data node manager (100), the data nodes (110) include the functionality to generate processed data. To generate processed data, the data nodes (110) may include the functionality to perform the methods depicted in FIG. 2B. For additional information regarding generating processed data, refer to FIG. 2B. The data nodes (110) may include other and/or additional functionalities without departing from the invention.

In one or more embodiments of the invention, each data node (e.g., 110A, 110N) of the data nodes (110) includes either an auto-encoder or an auto-classifier (both not shown in FIG. 1). Data nodes (110) that have access to or otherwise obtain labeled data to use to generate processed data may include auto-classifiers, while data nodes (110) that do not have access to or otherwise obtain labeled data (i.e., only unlabeled data is available) may include auto-encoders.

In one or more embodiments of the invention, an auto-encoder is one or more neural networks that include the functionality to compress and decompress large quantities of data. The auto-encoder may compress and decompress data using any appropriate method of data compression and data decompression without departing from the invention. For example, the auto-encoder may reduce the dimensionality of unlabeled data by training the neural network to ignore insignificant data of the unlabeled data, or encode the unclassified processed data to represent the unlabeled data using less data by eliminating repeating data. The auto-encoder may be trained using the unlabeled data. The auto-encoder may also generate rebuilt unlabeled data using the unclassified processed data. The auto-encoder may generate unclassified processed data using unlabeled live data of the data node (e.g., 110A) associated with the auto-encoder. The unclassified processed data may include compressed unlabeled live data. The auto-encoder may include other and/or additional functionalities without departing from the invention.

In one or more embodiments of the invention, auto-encoders are implemented as computer instructions, e.g., computer code, stored on a persistent storage (not shown) of data nodes (110) that when executed by a processor, hardware controller, or other component of the data nodes (110) cause the data nodes (110) to provide the functionality of the auto-encoders described throughout this application.

In one or more embodiments of the invention, the auto-encoders are implemented as physical devices. The physical devices may include circuitry. The physical devices may be, for example, a field-programmable gate arrays, application specific integrated circuits, programmable processors, microcontrollers, digital signal processors, or other hardware processors of the data nodes (110). The physical devices may be configured to provide the functionality of the auto-encoders described throughout this application.

In one or more embodiments of the invention, auto-classifiers include the functionality to both compress and decompress data as well as predict a label distribution for the data. The auto-classifiers may include the one or more neural networks of the auto-encoders discussed above to compress and decompress data. For additional information regarding the compression and decompression of data, refer to the above discussion of auto-encoders. The auto-classifiers may include one or more additional neural networks that include the functionality to predict the label distribution of the data that it is compressing and decompressing. The auto-classifiers may generate prediction of label distributions using any appropriate prediction method without departing from the invention. The auto-classifiers may be trained using labeled data. The auto-classifiers may generate classified processed data. Classified processed data may include compressed data and a prediction of label distributions associated with the compressed data. The auto-classifiers may include other and/or additional functionalities without departing from the invention.

In one or more embodiments of the invention, auto-classifiers are implemented as computer instructions, e.g., computer code, stored on a persistent storage (not shown) of data nodes (110) that when executed by a processor, hardware controller, or other component of the data nodes (110) cause the data nodes (110) to provide the functionality of the auto-classifiers described throughout this application.

In one or more embodiments of the invention, the auto-classifiers are implemented as physical devices. The physical devices may include circuitry. The physical devices may be, for example, a field-programmable gate arrays, application specific integrated circuits, programmable processors, microcontrollers, digital signal processors, or other hardware processors of the data nodes (110). The physical devices may be configured to provide the functionality of the auto-classifiers described throughout this application.

In one or more embodiments of the invention, the data nodes (110) are implemented as computing devices. The computing devices may be an embodiment of the computing device discussed above. For additional information regarding computing devices, refer to the above discussion or to FIG. 4.

Figure 2A:
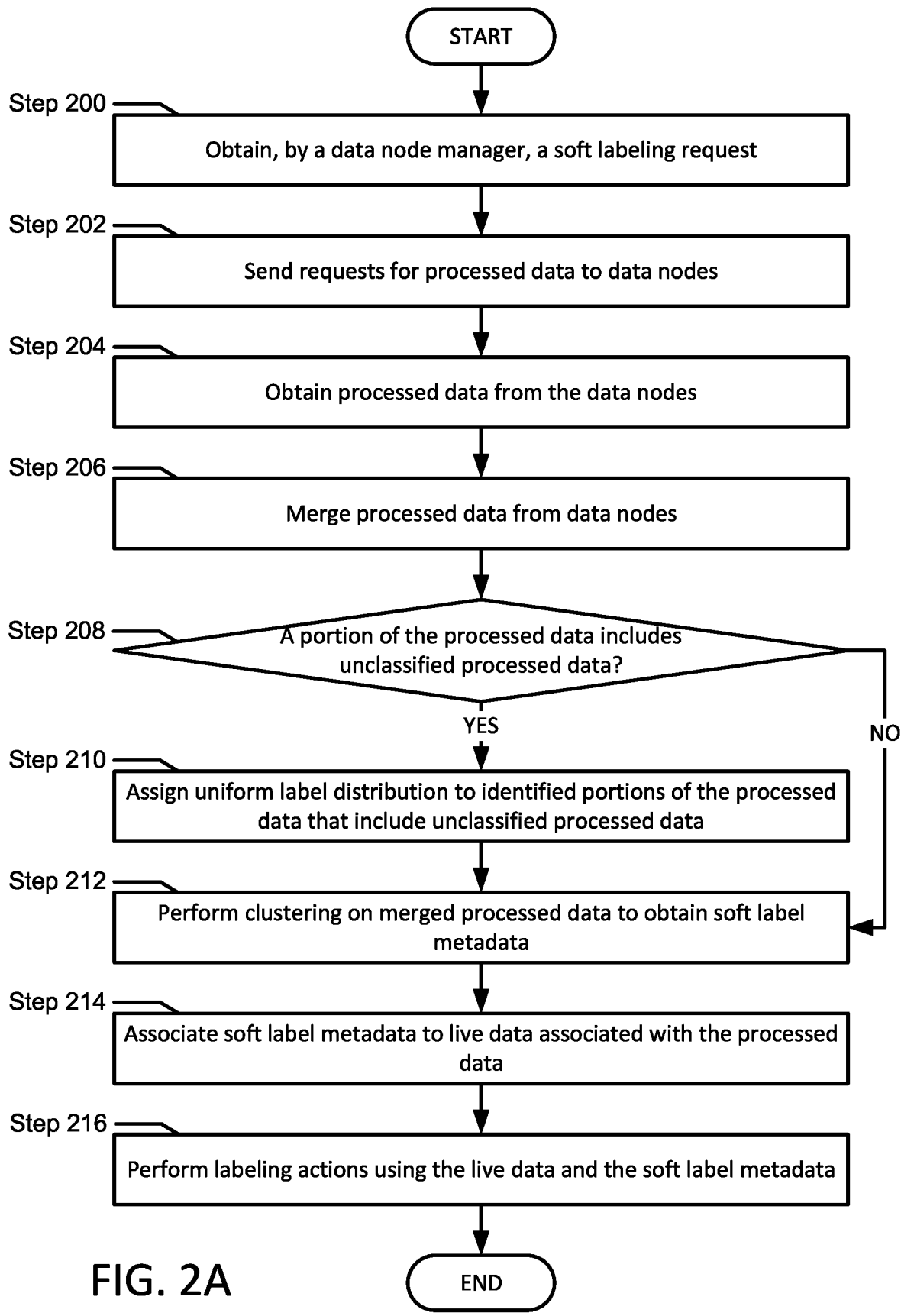
FIG. 2A shows a flowchart of a method in accordance with one or more embodiments of the invention.

FIG. 2A shows a flowchart of a method in accordance with one or more embodiments of the invention. The method depicted in FIG. 2A may be performed by a data node manager to generate and assign soft labels to data node data. All, or a portion of, the method of FIG. 2A may be performed by other components illustrated in FIG. 1 without departing from the invention.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a soft labeling request is obtained by the data node manager. In one or more embodiments of the invention, the data manager obtains a message. The message may include a request to obtain soft labels associated with live data of data nodes associated with the data node manager. The message may include other and/or additional information without departing from the invention. The message may be obtained from a data node and/or a user of the data node manager (e.g., a human annotator). The soft labeling request may be provided to the data node manager using any appropriate method of data transmission without departing from the invention. As an example, the data node or user may communicate the soft labeling request as network data traffic units over a series of network devices that operatively connect to the data node or the user to the data node manager. The soft labeling request may be obtained by the data node manager via other and/or additional methods without departing from the invention.

In Step 202, a request for processed data is sent to the data nodes. In one or more embodiments of the invention, the data node manager sends messages to the data nodes associated with the data node manager. The messages may include requests for processed data. The messages may include other and/or additional information without departing from the invention. The requests for processed data may be provided to the data nodes using any appropriate method of data transmission without departing from the invention. As an example, the data node manager may communicate the processed data request as network data traffic units over a series of network devices that operatively connect to the data nodes to the data node manager. The request for processed data may be sent to the data nodes via other and/or additional methods without departing from the invention.

In one or more embodiments of the invention, the data node manager may include a data node registry in which data node information associated with each data node that is connected to and/or otherwise associated with the data node manager. The data node registry may be one or more data structures that includes the aforementioned data node information. The data node information may include, for each data node of the data nodes, a data node identifier (e.g., a unique combination of bits associated with a specific data node) and communication information (e.g., network address, port number, etc.) used to transmit data and/or other communications between the data node manager and the data node. The data node information may include other and/or additional information associated with the data nodes (e.g., geographic location, labels associated with the data node, etc.) without departing from the invention. The data node registry may be stored in any type of data storage device of the data node manager or connected to the data node manager without departing from the invention. The data node manager may use the data node information included in the data node registry to send requests for processed data. The data node information may be provided to the data node manager by the data nodes or a user of the system when a data node registers with or connects to the data node manager.

In one or more embodiments of the invention, the data node manager may send processed data requests to a subset of data nodes connected to or otherwise associated with the data node manager. As a result, the quantity of data transmitted to the data node manager may be reduced as not all data nodes would provide processed data to the data node manager. The data node manager may identify the subset of data nodes using any appropriate method of data node subset selection without departing from the invention. For example, the data node manager may identify a random subset of data nodes or identify a subset of data nodes based on one or more selection requirements (e.g., data nodes associated with particular labels, data nodes located in a particular geographic location, etc.). The selection requirements may be specified in the soft labeling request. Additionally, the data node information included in the aforementioned data node registry may be used to identify the subset of data nodes based on the selection requirements.

In Step 204, processed data is obtained from the data nodes. In one or more embodiments of the invention, the data nodes or a subset of the data nodes send messages to the data node manager. The messages may include the processed data generated by each of the data nodes or by each of the subset of data nodes. The messages may include other and/or additional information without departing from the invention. The data nodes or the subset of data nodes may generate the processed data in response to the processed data requests obtained from the data node manager in Step 202. For additional information regarding the generation of processed data, refer to FIG. 2B. The processed data may include classified processed data and/or unclassified processed data. The processed data may be provided to the data node manager using any appropriate method of data transmission without departing from the invention. As an example, the data nodes may communicate the processed data as network data traffic units over a series of network devices that operatively connect the data nodes to the data node manager. The processed data may be obtained from the data nodes via other and/or additional methods without departing from the invention.

In Step 206, processed data from the data nodes is merged. In one or more embodiments of the invention, the data node manager merges the processed data obtained from each data node into a single collection (e.g., file) of processed data where the data node manager may use all of the processed data obtained from each data node. The data node manager may perform multiple merges as processed data is obtained from each data node, or the data node manager may perform a single merge of the processed data, when processed data is obtained from all data nodes (or all data nodes of the subset of data nodes) without departing from the invention. The processed data from the data nodes may be merged via other and/or additional methods without departing from the invention.

In Step 208, a determination is made as to whether a portion of the processed data includes unclassified processed data. As discussed above, the processed data may include unclassified processed data and/or classified processed data. Unclassified processed data may only include compressed data, while classified processed data may include both compressed data and predictions of label distributions associated with the compressed data. The data node manager may check the merged processed data for any portion of the merged processed data that does not include a prediction of label distributions associated with the compressed data. In one or more embodiments of the invention, if the data node manager identifies a portion of the processed data that does not include a prediction of label distributions associated with compressed data, then the data node manager determines that a portion of the processed data includes unclassified processed data. In one or more embodiments of the invention, if the data node manager does not identify a portion of the processed data that does not include a prediction of label distributions associated with compressed data, then the data node manager determines that no portion of the processed data includes unclassified processed data. The determination as to whether the processed data includes unclassified processed data may be made via other and/or additional methods without departing from the invention.

In one or more embodiments of the invention, if it is determined that a portion of the processed data includes unclassified processed data, then the method proceeds to step 210. In one or more embodiments of the invention, if it is determined that no portion of the processed data includes unclassified processed data, then the method proceeds to step 212.

In Step 210, a uniform label distribution is assigned to identified portions of the processed data that include unclassified processed data. In one or more embodiments of the invention, the data node manager assigns uniform label distributions to the portions of the processed data that do not include predictions of label distributions associated with the compressed data. The uniform label distributions may include equal probabilities that the associated compressed data includes each relevant label. As a result, the processed data now includes predictions of label distributions for all compressed data included in the processed data. The processed data may now be used to generate soft labels. The uniform label distribution may be assigned to the identified portions of the processed data that include unclassified processed data via other and/or additional methods without departing from the invention.

In Step 212, clustering is performed on the merged processed data to obtain soft label metadata. In one or more embodiments of the invention, the data node manager performs supervised soft clustering on the compressed data, and the predicted label distributions of the merged processed data using a clustering algorithm. The data node manager may use any appropriate method of clustering to perform the supervised soft clustering without departing from the invention. As an example, the data node manager may use Gaussian mixture models with Bayesian priors, where the Bayesian priors are the predicted label distributions associated with the compressed data of the processed data. The Gaussian mixture models may input the compressed data and the Bayesian priors and optimize the predicted label distributions to converge on a final label distribution output associated with the compressed data of the processed data. The final label distribution output may be the resulting soft label metadata. Clustering may be performed on the merged processed data to obtain soft label metadata may be performed via other and/or additional methods without departing from the invention.

In Step 214, the soft label metadata is associated to live data associated with the processed data. In one or more embodiments of the invention, the data node manager associates the final label distribution outputs of the soft label metadata with live data used to generate the processed data. The data node manager may obtain the live data from the data nodes or the subset of data nodes from which the processed data was obtained. The data node manager may associate the final label distribution outputs with the live data from data nodes using any appropriate method of association (e.g., using references such as pointers, relating sample identifiers of samples of the live data with final label distribution outputs based on the associated compressed data, etc.) without departing from the invention. The soft label metadata may be associated with the live data associated with the processed data via other and/or additional methods without departing from the invention.

In Step 216, labeling actions are performed using the live data and the soft label metadata. In one or more embodiments of the invention, the labeling actions may include any number of actions taken by the data node manager to perform labeling. The labeling actions may include, for example, generating hard labels for the live data based on a threshold using the soft label metadata, providing the live data and the soft label metadata to a user (e.g., human annotator) to verify the soft label metadata, and/or storing the live data and soft label metadata for future use. The labeling actions may include other and/or additional actions performed to label live data without departing from the invention. The labeling action may be performed using the live data and the soft label metadata via other and/or additional methods without departing from the invention.

In one or more embodiments of the invention, the method ends following Step 216.

Figure 2B:
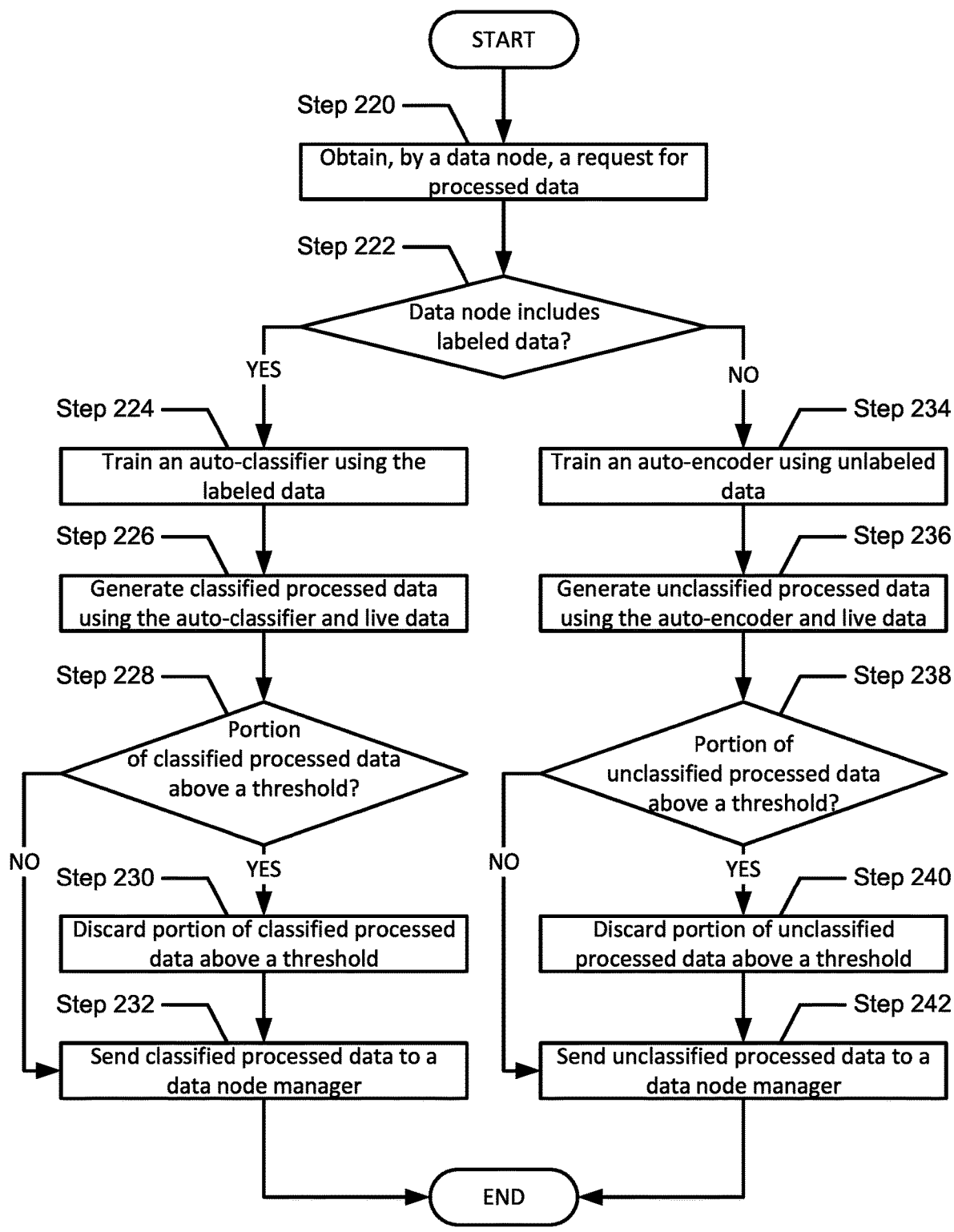
FIG. 2B shows a flowchart of a method in accordance with one or more embodiments of the invention.

FIG. 2B shows a flowchart of a method in accordance with one or more embodiments of the invention. The method depicted in FIG. 2B may be performed by a data node to generate processed data. All, or a portion of, the method of FIG. 2B may be performed by other components illustrated in FIG. 1 without departing from the invention.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, a request for processed data is obtained by the data node. In one or more embodiments of the invention, the data node obtains a message from the data node manager. The message may include a request for processed data. The message may include other and/or additional information without departing from the invention. The request for processed data may be provided to the data node using any appropriate method of data transmission without departing from the invention. As an example, the data node manager may communicate the processed data request as network data traffic units over a series of network devices that operatively connect the data node to the data node manager. The request for processed data may be obtained by the data nodes via other and/or additional methods without departing from the invention.

In Step 222, a determination is made as to whether the data node includes labeled data. As discussed above, the data node may include or otherwise have access to labeled or unlabeled data used for training an auto-classifier or an auto-encoder respectively. The training data may be obtained by the data node through sensors (e.g., image data obtained through cameras of the data node), obtained from the data node manager, or obtained from a user of the system. The data node may check the available training data that is to be used to train the auto-classifier or auto-encoder. If the available training data includes labels associated with the training data, then the data node may determine that the data node includes labeled data. If the available training data does not include labels associated with the training data, then the data node may determine that the data node does not include labeled data. The determination as to whether the data node includes labeled data may be made via other and/or additional methods without departing from the invention.

In one or more embodiments of the invention, if it is determined that the data node includes labeled data, then the method proceeds to Step 224. In one or more embodiments of the invention, if it is determined that the data node does not include labeled data, then the method proceeds to Step 234.

In Step 224, an auto-classifier is trained using the labeled data. In one or more embodiments of the invention, the data node applies the labeled data to an auto-classifier algorithm to generate an auto-classifier. The data node may use portions of the labeled data to perform optimizations on the auto-classifier. In other words, a first portion of the labeled data may be used by the data node to generate a first auto-classifier. The data node may then use a second portion of the labeled data to perform optimization by generating compressed data, generating predicted label distributions, and generating rebuilt data using the compressed data. The data node may compare the second portion of the labeled data with the rebuilt data as well as the predicted label distributions with the labels of the second portion of the labeled data to determine how to optimize the auto-classifier to improve performance on subsequent portions of the labeled data. The data node may perform any number of optimizations without departing from the invention to generate the auto-classifier. The auto-classifier may be trained using the labeled data via other and/or additional methods without departing from the invention.

In Step 226, classified processed data is generated using the auto-classifier and live data. In one or more embodiments of the invention, the data node applies the auto-classifier to live data to generate classified processed data. The data node may obtain live data from data node components (e.g., cameras, microphones, etc.), other data nodes, the data node manager, and/or other entities in illustrated in the system of FIG. 1. The live data may not include labels and may require soft label generation. The live data may include any quantity of data obtained by and/or otherwise associated with the data node. The live data may include data obtained by the data node over a period of time. As discussed above, the classified processed data includes compressed live data and predicted label distributions associated with the compressed live data. The classified processed data may be generated using the auto-classifier and the live data. The classified processed data may be generated using the auto-classifier and the live data via other and/or additional methods without departing from the invention.

In Step 228, a determination is made as to whether a portion of the classified processed data is above a threshold. In one or more embodiments of the invention, the data node compares each sample (e.g., image) of the rebuilt live data generated by the auto-classifier with corresponding sample of the original live data. The data node may use a threshold to determine whether the rebuilt live data generated by the auto-classifier is a sufficient representation of the original live data. As a result, the compressed data used to generate the rebuilt live data may include errors and/or critical data loss necessary for accurately representing the original live data. The threshold may be an error threshold that denotes a difference (e.g., percent difference) between the original live data and the rebuilt live data. If the error is above the error threshold for any sample of the live data and the rebuilt live data, then the data node may determine that a portion of the classified processed data is above a threshold. If the error is not above the error threshold for the entirety of the samples of the live data and the rebuilt live data, then the data node may determine that no portion of the classified processed data is above a threshold. The determination as to whether a portion of the classified processed data is above a threshold may be made via other and/or additional methods without departing from the invention.

In one or more embodiments of the invention, if it is determined that a portion of the classified processed data is above a threshold, then the method proceeds to Step 230. In one or more embodiments of the invention, if it is determined that no portion of the classified processed data is above a threshold, then the method proceeds to Step 232.

In Step 230, the portion of the classified processed data above the threshold is discarded. In one or more embodiments of the invention, the data node deletes (e.g., by removing, overwriting, etc.) the compressed data and predicted label distributions of the classified processed data associated with samples of rebuilt live data that were above a threshold when compared to the original live data as discussed above in Step 228. As a result, the classified processed data may only include compressed data and predicted label distributions that include sufficient representations of the original live data, thereby improving the accuracy of the generated soft labels using the classified processed data. The portion of the classified processed data above the threshold may be discarded via other and/or additional methods without departing from the invention.

In Step 232, the classified processed data is sent to the data node manager. In one or more embodiments of the invention, the data node sends a message to the data node manager. The message may include the classified processed data. The message may include other and/or additional information without departing from the invention. The classified processed data may be provided to the data node manager using any appropriate method of data transmission without departing from the invention. As an example, the data node may communicate the classified processed data as network data traffic units over a series of network devices that operatively connect the data node to the data node manager. The classified processed data may be sent to the data node manager via other and/or additional methods without departing from the invention.

In one or more embodiments of the invention, the method ends following Step 232.

In Step 234, an auto-encoder is trained using unlabeled data. In one or more embodiments of the invention, the data node applies the unlabeled data to an auto-encoder algorithm to generate an auto-encoder. The data node may use portions of the unlabeled data to perform optimizations on the auto-encoder. In other words, a first portion of the unlabeled data may be used by the data node to generate a first auto-encoder. The data node may then use a second portion of the unlabeled data to perform optimization by generating compressed data and generating rebuilt data using the compressed data. The data node may compare the second portion of the unlabeled data with the rebuilt data to determine how to optimize the auto-encoder to improve performance on subsequent portions of the unlabeled data. The data node may perform any number of optimizations without departing from the invention to generate the auto-encoder. The auto-encoder may be trained using the unlabeled data via other and/or additional methods without departing from the invention.

In Step 236, unclassified processed data is generated using the auto-encoder and live data. In one or more embodiments of the invention, the data node applies the auto-encoder to live data to generate unclassified processed data. The data node may obtain live data from data node components (e.g., cameras, microphones, etc.), other data nodes, the data node manager, and/or other entities illustrated in the system of FIG. 1. The live data may not include labels and may require soft label generation. The live data may include any quantity of data obtained by and/or otherwise associated with the data node. The live data may include data obtained by the data node over a period of time. As discussed above, the unclassified processed data includes compressed live data. The unclassified processed data may be generated using the auto-encoder and the live data. The unclassified processed data may be generated using the auto-encoder and the live data via other and/or additional methods without departing from the invention.

In Step 238, a determination is made as to whether a portion of the unclassified processed data is above a threshold. In one or more embodiments of the invention, the data node compares each sample (e.g., image) of the rebuilt live data generated by the auto-encoder with corresponding sample of the original live data. The data node may use a threshold to determine whether the rebuilt live data generated by the auto-encoder is a sufficient representation of the original live data. As a result, the compressed data used to generate the rebuilt live data may include errors and/or critical data loss necessary for accurately representing the original live data. The threshold may be an error threshold that denotes a difference (e.g., percent difference, absolute difference, etc.) between the original live data and the rebuilt live data. If the error is above the error threshold for any sample of the live data and the rebuilt live data, then the data node may determine that a portion of the unclassified processed data is above a threshold. If the error is not above the error threshold for the entirety of the samples of the live data and the rebuilt live data, then the data node may determine that no portion of the unclassified processed data is above a threshold. The determination as to whether a portion of the unclassified processed data is above a threshold may be made via other and/or additional methods without departing from the invention.

In one or more embodiments of the invention, if it is determined that a portion of the unclassified processed data is above a threshold, then the method proceeds to Step 240.

In one or more embodiments of the invention, if it is determined that no portion of the unclassified processed data is above a threshold, then the method proceeds to Step 242.

In Step 240, the portion of the unclassified processed data that is above a threshold is discarded. In one or more embodiments of the invention, the data node deletes (e.g., by removing, overwriting, etc.) the compressed data of the unclassified processed data associated with samples of rebuilt live data that were above a threshold when compared to the original live data as discussed above in Step 238. As a result, the unclassified processed data may only include compressed data that include sufficient representations of the original live data, thereby improving the accuracy of the generated soft labels using the unclassified processed data. The portion of the unclassified processed data above the threshold may be discarded via other and/or additional methods without departing from the invention.

In Step 242, unclassified processed data is sent to the data node manager. In one or more embodiments of the invention, the data node sends a message to the data node manager. The message may include the unclassified processed data. The message may include other and/or additional information without departing from the invention. The unclassified processed data may be provided to the data node manager using any appropriate method of data transmission without departing from the invention. As an example, the data node may communicate the unclassified processed data as network data traffic units over a series of network devices that operatively connect the data node to the data node manager. The unclassified processed data may be sent to the data node manager via other and/or additional methods without departing from the invention.

In one or more embodiments of the invention, the method ends following Step 242.

Example

Figure 3:
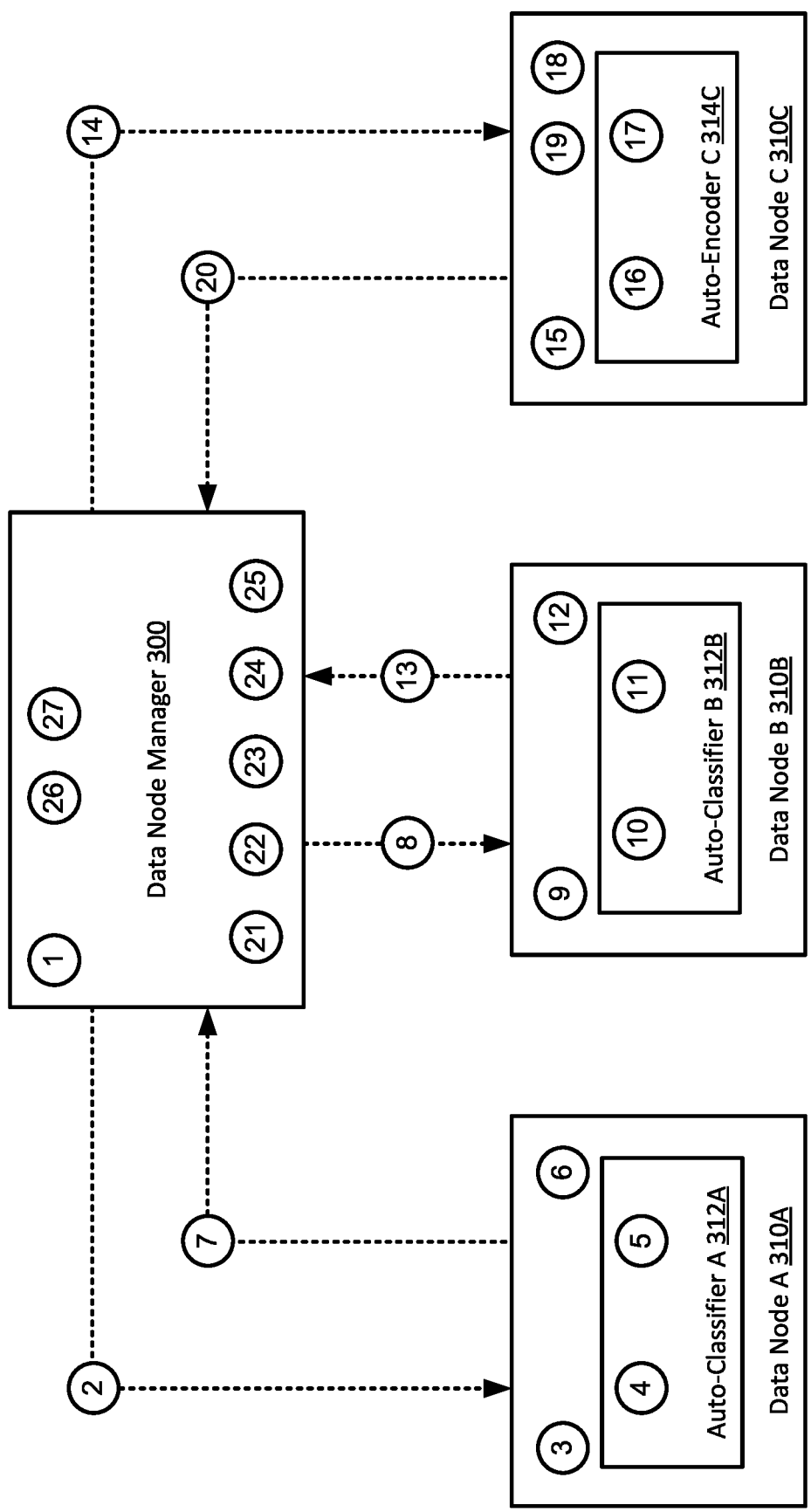
FIG. 3 shows a diagram of the operation of an example system over time in accordance with one or more embodiments of the invention.

FIG. 3 shows a diagram of the operation of an example system over time in accordance with one or more embodiments of the invention. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein.

Referring to FIG. 3, consider a scenario in which a car company has deployed three smart vehicles that each use inferencing to perform autopilot using cameras attached to the car. The car company wants to improve the efficiency of labeling images, captured by the cars, to improve the inferencing models used by the cars. To do so, the car company sets up a data center that is connected to each of the three cars to generate and assign soft labels to improve the efficiency of labeling large quantities of image data obtained by the three vehicles.

In such a scenario, the car company data center is the data node manager (300), while the three vehicles are data nodes. The first vehicle is data node A (310A), the second vehicle is data node B (310B), and the third vehicle is data node C (310C). Each data node (310A, 310B, 310C) is operatively connected to the data node manager (300). At Step 1, a car company employee submits a soft labeling request to the data node manager (300). In response to obtaining the soft labeling request, at Step 2, the data node manager (300) sends a processed data request to data node A (310A). In response to obtaining the processed data request, at Step 3, data node A (310A) determines that it includes labeled data obtained from the data node manager (300) at some point in time prior to Step 1. In response to the determination of Step 3, at Step 4, data node A (310A) generates auto-classifier A (312A) using the labeled data associated with data node A (310A). After generating auto-classifier A (312A), at Step 5, data node A (310A) generates classified processed data using auto-classifier A (312A) and live data associated with data node A (310A). Then, at Step 6, data node A (310A) compares the generated classified processed data with the live data and determines that no portion of the classified processed data is above an error threshold. Thus, the classified processed data includes compressed live data that include sufficient representations of the live data. In response to the determination of Step 6, at Step 7, data node A (310A) sends the classified processed data to the data node manager (300).

Next, at Step 8, the data node manager (300) sends a processed data request to data node B (310B). In response to obtaining the processed data request, at Step 9, data node B (310B) determines that it includes labeled data obtained from the data node manager (300) at some point in time prior to Step 8. In response to the determination of Step 9, at Step 10, data node B (310B) generates auto-classifier B (312B) using the labeled data associated with data node B (310B). After generating auto-classifier B (312B), at Step 11, data node B (310B) generates classified processed data using auto-classifier B (312B) and live data associated with data node B (310B). Then, at Step 12, data node B (310B) compares the generated classified processed data with the live data and determines that no portion of the classified processed data is above an error threshold. Thus, the classified processed data includes compressed live data that include sufficient representations of the live data. In response to the determination of Step 12, at Step 13, data node B (310B) sends the classified processed data to the data node manager (300).

Next, at Step 14, the data node manager (300) sends a processed data request to data node C (310C). In response to obtaining the processed data request, at Step 15, data node C (310C) determines that it includes unlabeled data obtained from the data node manager (300) at some point in time prior to Step 14. In response to the determination of Step 15, at Step 16, data node C (310C) generates auto-encoder C (314C) using the unlabeled data associated with data node C (310C). After generating auto-encoder C (314C), at Step 17, data node C (310C) generates unclassified processed data using auto-encoder C (314C) and live data associated with data node C (310C). Then, at Step 18, data node C (310C) compares the generated unclassified processed data with the live data and determines that a portion of the unclassified processed data is above an error threshold. Thus, at Step 19, data node C (310C) deletes the portion of the unclassified processed data that is above the error threshold, thereby including only compressed data sufficiently representative of the original live data. Then, at Step 20, data node C (310C) sends the unclassified processed data to the data node manager (300).

For simplicity, processed data was obtained by the data node manager (300) from data node A (310A), data node B (310B) and then data node C (310C). Embodiments of the invention allow for processed data to be obtained from a different order of the data nodes (e.g., 310B, 310C, 310A) or from each data node (310A, 310B, 310C) in parallel.

Returning to FIG. 3, at Step 21, the data node manager merges the processed data obtained from the three data nodes (310A, 310B, 310C). At Step 22, the data node manager determines that the merged processed data includes unclassified processed data obtained from data node C (310C). In response to the determination of Step 22, at Step 23, the data node manager (300) assigns a uniform label distribution to the unclassified processed data obtained from data node C (310C). At Step 24, the data node manager performs clustering on the processed data to generate soft label metadata. After generating the soft label metadata, the data node manager (300) obtains the live data associated with each data node (310A, 310B, 310C) (not shown in FIG. 3). At Step 25, the data node manager (300) associates the soft label metadata with the corresponding live data of the data nodes (310A, 310B, 310C). At Step 26, the data node manager (300) provides the live data of the data nodes (310A, 310B, 310C) and the soft label metadata to an employee of the car company for further review.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments described herein use processed data from data nodes to generate and assign soft labels associated with large quantities of data of the data nodes by a data node manager with the computing resources required to do so. The soft labels indicate probabilities that data samples include relevant labels required for using or training machine learning models. The soft labels may be used to further improve the efficiency of labeling large quantities of data by augmenting human annotation or by automatically assigning hard labels based on the soft labels.

Thus, embodiments of the invention may address the problem of inefficient use of computing resources to label large quantities of data node data. This problem arises due to the technological nature of the environment in which the data nodes operate.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing data of data nodes, the method comprising:
   obtaining, by a data node manager, a soft labeling request;
   in response to obtaining the soft labeling request:
      sending, by the data node manager, requests for processed data to data nodes associated with the data node manager;
      obtaining, by the data node manager, a plurality of processed data from the data nodes, wherein the plurality of processed data comprises:
         first processed data obtained from a first data node of the data nodes and comprising unclassified processed data generated and verified using an auto-encoder neural network; and
         second processed data obtained from a second data node of the data nodes and comprising classified processed data generated and verified using an auto-classifier neural network;
      merging, by the data node manager, the plurality of processed data to obtain processed data;
      performing, by the data node manager, clustering on the processed data to obtain soft label metadata;
      associating, by the data node manager, the soft label metadata with live data associated with the data nodes; and
      performing, by the data node manager, labeling actions using the live data and the soft label metadata.

2. The method of claim 1, wherein the unclassified processed data comprises compressed data.

3. The method of claim 1, wherein the classified processed data comprises:
   compressed data, and
   predicted label classification distributions associated with the compressed data.

4. The method of claim 3, wherein the live data associated with the data nodes comprises unlabeled data associated with the data nodes.

5. The method of claim 1, further comprising:
   after the merging, by the data node manager, of the plurality of processed data to obtain processed data and prior to performing, by the data node manager, the clustering on the processed data to obtain soft label metadata:
      making a first determination, by the data node manager, that a portion of the processed data includes unclassified processed data; and
      in response to the first determination:
         assigning, by the data node manager, a uniform classification distribution to the portion of the processed data.

6. The method of claim 5, further comprising:
   after sending, by the data node manager, the requests for processed data to the data nodes and prior to obtaining, by the data node manager, the processed data from the data nodes:
      obtaining, by a data node of the data nodes, a request for processed data of the requests for processed data;
      making a second determination, by the data node, that the data node includes unlabeled data; and
      in response to the second determination:
         training, by the data node, the auto-encoder neural network using the unlabeled data;
         generating, by the data node, unclassified processed data of the plurality of processed data using the auto-encoder neural network and first live data of the live data;
         making a third determination, by the data node, that a portion of the unclassified processed data is associated with an error that is above a threshold; and
         in response to the third determination:
            discarding the portion of the unclassified processed data; and
            sending the unclassified processed data to the data node manager, wherein the unclassified processed data does not comprise the discarded portion of the unclassified processed data.

7. The method of claim 5, further comprising:
   after sending, by the data node manager, requests for processed data to the data nodes and prior to obtaining, by the data node manager, the processed data from the data nodes:
      obtaining, by a data node of the data nodes, a request for processed data of the requests for processed data;
      making a second determination, by the data node, that the data node includes labeled data; and
      in response to the second determination:
         training, by the data node, the auto-classifier neural network using the labeled data;
         generating, by the data node, classified processed data of the plurality of processed data using the auto-classifier neural network and first live data of the live data;
         making a third determination, by the data node, that a portion of the classified processed data is associated with an error that is above a threshold; and
         in response to the third determination:
            discarding the portion of the classified processed data; and
            sending the classified processed data to the data node manager, wherein the classified processed data does not comprise the discarded portion of the classified processed data; and sending the classified processed data to the data node manager.

8. A non-transitory computer readable medium comprising computer readable program code, which when executed by a computer processor enables the computer processor to perform a method for managing data of data nodes, the method comprising:
obtaining, by a data node manager, a soft labeling request;
in response to obtaining the soft labeling request:
sending, by the data node manager, requests for processed data to data nodes associated with the data node manager;
obtaining, by the data node manager, a plurality of processed data from the data nodes, wherein the plurality of processed data comprises:
first processed data obtained from a first data node of the data nodes and comprising unclassified processed data generated and verified using an auto-encoder neural network; and
second processed data obtained from a second data node of the data nodes and comprising classified processed data generated and verified using an auto-classifier neural network;
merging, by the data node manager, the plurality of processed data to obtain processed data;
performing, by the data node manager, clustering on the processed data to obtain soft label metadata;
associating, by the data node manager, the soft label metadata with live data associated with the data nodes; and
performing, by the data node manager, labeling actions using the live data and the soft label metadata.

9. The non-transitory computer readable medium of claim 8, wherein the unclassified processed data comprises compressed data.

10. The non-transitory computer readable medium of claim 8, wherein the classified processed data comprises:
compressed data, and
predicted label classification distributions associated with the compressed data.

11. The non-transitory computer readable medium of claim 10, wherein the live data associated with the data nodes comprises unlabeled data associated with the data nodes.

12. The non-transitory computer readable medium of claim 8, further comprising:
after the merging, by the data node manager, of the plurality of processed data to obtain processed data and prior to performing, by the data node manager, the clustering on the processed data to obtain soft label metadata:
making a first determination, by the data node manager, that a portion of the processed data includes unclassified processed data; and
in response to the first determination:
assigning, by the data node manager, a uniform classification distribution to the portion of the processed data.

13. The non-transitory computer readable medium of claim 12, further comprising:
after sending, by the data node manager, the requests for processed data to the data nodes and prior to obtaining, by the data node manager, the processed data from the data nodes:
obtaining, by a data node of the data nodes, a request for processed data of the requests for processed data;
making a second determination, by the data node, that the data node includes unlabeled data; and
in response to the second determination:
training, by the data node, the auto-encoder neural network using the unlabeled data;
generating, by the data node, unclassified processed data of the plurality of processed data using the auto-encoder neural network and first live data of the live data;
making a third determination, by the data node, that a portion of the unclassified processed data is associated with an error that is above a threshold; and
in response to the third determination:
discarding the portion of the unclassified processed data; and
sending the unclassified processed data to the data node manager, wherein the unclassified processed data does not comprise the discarded portion of the unclassified processed data.

14. The non-transitory computer readable medium of claim 12, further comprising:
after sending, by the data node manager, requests for processed data to the data nodes and prior to obtaining, by the data node manager, the processed data from the data nodes:
obtaining, by a data node of the data nodes, a request for processed data of the requests for processed data;
making a second determination, by the data node, that the data node includes labeled data; and
in response to the second determination:
training, by the data node, the auto-classifier neural network using the labeled data;
generating, by the data node, classified processed data of the plurality of processed data using the auto-classifier neural network and first live data of the live data;
making a third determination, by the data node, that a portion of the classified processed data is associated with an error that is above a threshold; and
in response to the third determination:
discarding the portion of the classified processed data; and
sending the classified processed data to the data node manager, wherein the classified processed data does not comprise the discarded portion of the classified processed data; and
sending the classified processed data to the data node manager.

15. A system for managing data of data nodes, the system comprising:
a data node manager associated with data nodes, comprising a processor and memory, and configured to:
obtain a soft labeling request;
in response to obtaining the soft labeling request:
send requests for processed data to data nodes associated with the data node manager;
obtain a plurality of processed data from the data nodes, wherein the plurality of processed data comprises:
first processed data obtained from a first data node of the data nodes and comprising unclassified processed data generated and verified using an auto-encoder neural network; and
second processed data obtained from a second data node of the data nodes and comprising classified processed data generated and verified using an auto-classifier neural network;

merge the plurality of processed data to obtain processed data;

perform clustering on the processed data to obtain soft label metadata;

associate the soft label metadata with live data associated with the data nodes; and perform labeling actions using the live data and the soft label metadata.

16. The system of claim 15, wherein the unclassified processed data comprises compressed data.

17. The system of claim 15, wherein the classified processed data comprises:

compressed data, and predicted label classification distributions associated with the compressed data.

* * * * *